July 2, 1957 L. J. MANN 2,797,720
SHEET METAL NUT WITH SCREW SLOT HAVING FRANGIBLE SERRATIONS
Filed Dec. 14, 1953

INVENTOR.
Leonard J. Mann
BY
R. R. Condor
His Attorney

United States Patent Office 2,797,720
Patented July 2, 1957

2,797,720

SHEET METAL NUT WITH SCREW SLOT HAVING FRANGIBLE SERRATIONS

Leonard J. Mann, Dayton, Ohio, assignor to General Motors Corporation, Detroit, Mich., a corporation of Delaware Application December 14, 1953, Serial No. 397,888

2 Claims. (Cl. 151—41.75)

This invention relates to refrigerating apparatus and more particularly to a sheet metal fastener for use in attaching a trim strip or collar to the front edge of the inner liner of a refrigerator.

The holes of the inner liner which are used for attaching the trim strip are made while the liner is in the form of a flat sheet metal plate and consequently when the flat sheet is bent into box-shape the location of these holes varies somewhat from one liner to the other. As a result of this variation considerable difficulty is sometimes experienced in attaching the trim strip to the liner. This difficulty is made worse by the fact that the sheet metal nuts used with the attaching screws are concealed from view and are inaccessible. In the past it has been customary to provide elongated slots in the sheet metal liner so as to make it possible to locate the sheet metal nut or fastener in any one of several positions in the slot so as to line up with the hole in the trim strip but even with such an arrangement considerable difficulty is experienced in properly positioning the nut within the slot especially in the vertically disposed slots as the nut tends to slide to the bottom of the slot. According to this invention the nut itself is provided with an elongated slot for receiving the shank of a fastening stud or screw.

Still another object of this invention is to provide a sheet metal fastener consisting essentially of two opposed spring tongues which form an elongated slot in which the edges of the slot are serrated.

Still another object of this invention is to provide an improved type of sheet metal fastener in which means are provided for facilitating the reshaping of the metal fastener upon engagement with the shank or fastening element.

Further objects and advantages of the present invention will be apparent from the following description, reference being had to the accompanying drawings, wherein a preferred form of the present invention is clearly shown.

Figure 2:
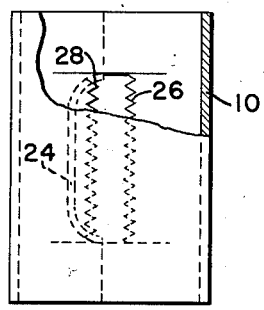
Figure 2 is a top view of the device shown in Figure 1 with parts broken away.
Figure 3:
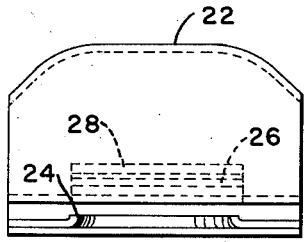
Figure 3 is a side elevational view of the same.
Figure 4:
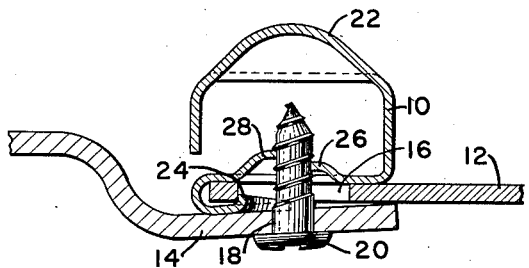
Figure 4 is a sectional view showing the device holding two panel sections together.
Figure 1:
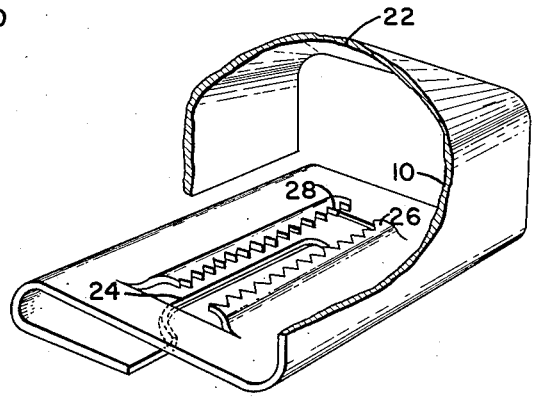
Figure 1 is a perspective view with parts broken away showing a preferred embodiment of the invention.

Referring now to the drawing wherein a preferred embodiment of the invention has been shown, reference numeral 10 generally designates a sheet metal fastener of the type particularly designed for use in what are known as blind fastening installations in which there is access to only one side or face of the supporting structure or equivalent member carrying the fastener.

Whereas the invention has been shown in connection with an assembly using a metal screw it is obvious that certain aspects of the invention are equally applicable to assemblies using various other types of fastening elements such as bolts or studs which may not have threads formed thereon.

For purposes of illustrating the invention a hooded nut has been shown whereas certain aspects of the invention are equally applicable for use in J nuts, U nuts or even strip nuts. Reference numeral 12 is used to designate a mounting panel such as the inner liner of a refrigerator whereas reference numeral 14 is used to designate a trim strip which is adapted to be attached to the front edge of the inner liner 12. As shown in Figure 2 of the drawing, the panel 12 is provided with a slot 16 adjacent each fastening element 10. The trim strip 14 is provided with a round hole 18 for receiving a metal screw 20 the head of which covers the hole 18. The fasteners shown are intended to be used in refrigerators wherein the insulation is mounted in sealed bags and consequently each fastener 10 is provided with a protective hood 22 which prevents the end of the screw from piercing the bag in which the insulation is provided.

A positioning cam or projection 24 is formed on the one spring arm of the fastener 10 as shown for yieldably holding the fastener 10 in place within the slot 16 in the panel 12. The length of the projecting portion 24 is only slightly less than the length of the slot 16 with the result that the projection holds the fastener 10 in place within the slot. A pair of spring fingers 26 and 28 which comprise screw shank engaging portions are tilted up from the plane of the rest of the metal overlying the inner side of the panel 12 as shown. The projecting edges of the spring fingers are serrated as shown and form an elongated serrated slot for engaging the fastening element 20 at any desired position within the slot. The upstanding finger portions 26 and 28 are offset from one another half the distance of the pitch of the threads of the screw for obvious reasons. The serrations being small are somewhat frangible so that once the shank of the fastening element is driven into place between the serrated shank engaging finger portions 26 and 28 one or more of the serrated projections give way to the fastening element. This then prevents any tendency of the fastening element from shifting endwise within the slot.

While the form of embodiment of the invention as herein disclosed constitutes a preferred form, it is to be understood that other forms might be adopted, as may come within the scope of the claims which follow.

What is claimed is as follows:

1. A fastening device comprising a sheet metal body provided with securing means for threadedly engaging a threaded fastener and means for attaching the fastening device on a supporting structure preparatory to the application of the threaded fastener thereto, said body having fastener engaging portions tilted up therefrom and forming an elongated slot of sufficient length for receiving the shank of the fastener element at a plurality of positions along the length of said opening, at least one of the edges of said slot being formed with frangible serrations a portion of which breaks off when said fastener element is inserted into said slot, the remainder of said serrations preventing movement of said fastener element along the length of said slot, one of the edges of said slot being spaced above the other by a distance equalling approximately one-half the pitch of said threaded fastener.

2. A fastener comprising a sheet metal body having an elongated opening therein for receiving the shank of a screw, said opening being defined by a pair of parallel edges with one of said edges being spaced above the other approximately one-half the pitch of the threads of said screw, at least one of said edges having frangible serrations extending therealong, the opening defined by said parallel edges being of sufficient length to receive the shank of said screw at a plurality of positions along its length, the frangible serrations engaged by said screw being adapted to break off when a screw is inserted between said parallel edges, the remainder of said frangible serrations preventing movement of said screw lengthwise of said opening when said screw is in place between said parallel edges.

References Cited in the file of this patent

UNITED STATES PATENTS

| | | |
|---|---|---|
| 2,233,230 | Tinnerman | Feb. 25, 1941 |
| 2,334,046 | Tinnerman | Nov. 9, 1943 |
| 2,574,107 | Joy | Nov. 6, 1951 |

FOREIGN PATENTS

| | | |
|---|---|---|
| 538,426 | Great Britain | Aug. 1, 1941 |
| 646,406 | Great Britain | Nov. 22, 1950 |